United States Patent [19]
Deisler et al.

[11] Patent Number: 4,746,180
[45] Date of Patent: May 24, 1988

[54] DEVICE FOR LIGHT TRANSMISSION

[75] Inventors: Manfred Deisler, Flintbek; Horst Lachenmann, Mielkendorf; Helmut Lange, Schoenkirchen; Ulrich Parl, Raisdorf; Holger Suhr, Kiel, all of Fed. Rep. of Germany

[73] Assignee: Dr. Ing. Rudolf Hell GmbH, Kiel, Fed. Rep. of Germany

[21] Appl. No.: 788,876

[22] Filed: Oct. 18, 1985

[30] Foreign Application Priority Data

Oct. 30, 1984 [EP] European Pat. Off. ........ 84113092.5

[51] Int. Cl.$^4$ ............................ G02B 6/00; G02B 6/14
[52] U.S. Cl. ..................................... 350/96.10; 355/1
[58] Field of Search ............... 350/96.10, 96.15, 96.20, 350/96.24, 96.25, 96.27, 96.28, 96.29; 355/1; 250/227

[56] References Cited

U.S. PATENT DOCUMENTS 4,439,022 3/1984 Gebhardt et al. .
4,523,805 6/1985 Nagashima et al. .

FOREIGN PATENT DOCUMENTS 3224850 2/1983 Fed. Rep. of Germany .
2057709 4/1981 United Kingdom .

OTHER PUBLICATIONS

*Laser Focus*, Sep. 1981, pp. 109–115, Modal Noise—Causes and Cures", R. E. Epworth.
Lichtleiter als Sensoran, *Elektronik*, No. 19, 1981, p. 16.

*Primary Examiner*—William L. Sikes
*Assistant Examiner*—Robert E. Wise
*Attorney, Agent, or Firm*—Hill, Van Santen, Steadman & Simpson

[57] ABSTRACT

A light transmission device for transmitting light from a stationary light source to a movable recording element of an electronic reproduction device composed of at least one fiber optical light waveguide and one guide element for the fiber optical waveguide. Due to the motion of a fiber optical waveguide, inhomogeneous light distributions arise at its exit face, this leading to disturbing streaked exposures of the recording medium. In the present invention to avoid such streak-like exposures, it is proposed that the guide element be a metal band which is mounted in a U-shape with the fiber optical waveguide being connected to one side of the metal band. Thus, as the recording element shifts, the curvature of the fiber optical waveguide remains constant to prevent shifting of the light distribution exiting the fiber optical waveguide.

14 Claims, 1 Drawing Sheet

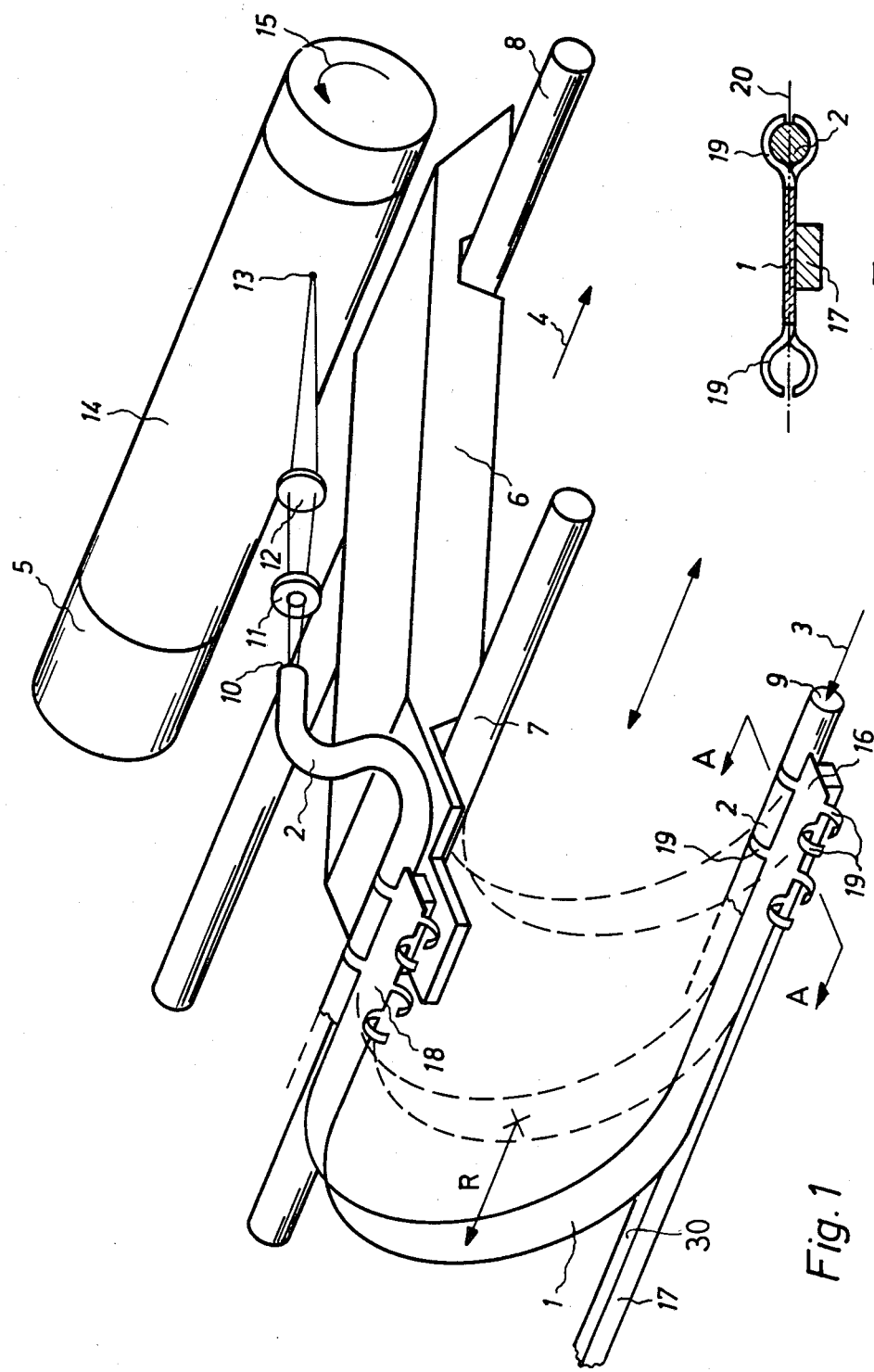

DEVICE FOR LIGHT TRANSMISSION

BACKGROUND OF THE INVENTION

The present invention is directed to a light transmission device for transmitting light between a stationary and movable location. The light transmission device is employed, for example, in electronic reproduction technology.

A light transmission device for transmitting light between a stationary and a movable location is usually composed of at least one fiber optic light waveguide and a movable guide element for the fiber optic light waveguide, for example, cable chains are employed as guide elements in traditional light transmission devices. The fiber optical light waveguide is composed of an actual light conductor which can be an individual fiber or a bundle of fibers and of a hose-like cladding or protective sheath.

Light transmission devices of this type are employed, for example, in electronic reproduction technology in a reproduction device for producing half-tone color separations or rastered color separations by an opto-electronic scanning of an original and by exposing a recording medium. In an electronic reproduction device for producing half-tone color separations, a bundle or beam of coherent light is generated in a laser light source. This beam of laser light is modulated in brightness in a stationary modulator by an image signal which was acquired in the original scanning. The modulated beam of laser light is transmitted to a recording element from the stationary modulator via a light transmission device comprising an individual fiber. The recording element moves axially along the recording drum on which the recording medium is clamped. The modulated beam of laser light emerging from the exit face of the individual fiber in the recording element is imaged on the recording medium as an exposure point by an arrangement including a diaphragm and a lens. This recording medium is then exposed point-by-point and line-by-line due to the relative motion between the recording element and the recording drum.

In electronic reproduction devices for producing rastered color separations, a plurality of coherent divided light beams or bundles are generated in a laser light source and these divided light beams are separately switched on and off in a stationary modulator by the image signals and are then transmitted via individual fibers of a fiber bundle of the light transmission device onto the moving recording element. In the recording element, the exit faces of the individual fibers are juxtaposed and are situated next to one another on a generated line of the recording drum so that the modulated divided light beams emerging from the individual fibers are imaged on the recording medium by means of a lens as a plurality of juxtaposed exposure points lying side-by-side. Due to the relative motion between the recording drum and the recording element, the exposure points generate write lines lying side-by-side whose lengths are respectively dependent on the on-time of the individual divided light beams. Every raster point is composed of such write lines so that the shape and size of the raster point depends on the length of the write lines or, respectively, on the respective on-time of the divided light beams.

Since, due to the small core diameter of a monomode-type light waveguide, it is very difficult to couple coherent light in a stable fashion into the monomode light waveguide, light waveguides of a multimode-type are usually employed for the light transmission. When, however, coherent light is coupled into the light waveguide of the multimode-type, then a plurality of modes are formed which, due to the mode interference, produce a mode pattern at the exit face thereof in the form of bright and dark spots and thus produce an inhomogeneous light distribution in the exit face.

An additional complicating factor is that the mode pattern shifts in the exit face due to bending and/or twisting movement of the light guide so that the light distribution and, in addition, the light intensity will chronologically change at the exit face. The problem of mode formations are disclosed, for example, in the article by R. E. Epworth, "Modal Noise-Causes and Cures", *Laser Focus,* September 1981, pages 109–115 and from an article in "Lichtleiter als Sensoran" *Elektronik,* No. 19, 1981, page 16.

With the employment of a traditional light transmission device, which comprises a cable chain and a light waveguide of a multimode-type extending between a stationary modulator and a displaceable recording element, changing friction conditions of the fiber optical light waveguide necessary occur when the cable chain uncoils. Thus, a continuous and discontinuous change of the mechanical tension between the core and jacket of the light waveguide on the one hand and between the light waveguide and the protective sheath on the other hand will occur from this changing frictional condition.

In an electronic reproduction device for producing half-tone color separations, the continuous or discontinuous change of the light distribution in the exit face of the light waveguide, which changes are caused by the motion sequence, leads to an inhomogeneous and chronological changing illumination of the diaphragm or, respectively, light distribution within the exposure spot which is further intensified due to the aperture limitation of the diaphragm. This causes density changes on the recording medium so that a half-tone area which is homogeneous per se is exposed in a streaky fashion. In a reproduction device for the production of rastered color separations by contrast, the chronological intensity changes differing in the individual divided light beams particularly lead to different densities in the write lines or, respectively, raster points. In both cases, disturbing density changes on the recording medium, which considerably deteriorate the reproduction quality, occur in the color separation.

It has been shown in practice that a gradual, large-area density change caused by a uniform motion or, respectively, tension changes of the light waveguide is not as noticeable to the human eye in a distrubing way as discontinuous, small-area density changes caused by a discontinuous motion or, respectively, tension change.

In order to avoid a streaky exposure in an electronic reproduction device for half-tone color separations, a process and arrangement is disclosed in U.S. Pat. No. 4,439,022, whose disclosure is incorporated by reference thereto. As disclosed by this process and apparatus, the modes emerging from the exit face of the light waveguide in the recording element are fanned with a scattering medium, the fanned modes are then superimposed in a superimposition range with a positive lens and the diaphragm is situated in the superimposition region so that a homogeneous diaphragm illumination and a uniform intensity distribution are always achieved for the exposure point. The disadvantage of this known optical arrangement is that it can only be employed when recording half-tone color separations.

Another solution for avoiding a streaky exposure is disclosed in U.S. Pat. No. 4,523,805 whose disclosure is incorporated by reference thereto. This solution is based on the perception that when the light waveguide is bent, the mode spots predominantly migrate into and out of the exit face, which is assumed to be circular, in a radial direction and thus migrate into and out of the diaphragm aperture so that a great chronological change of the light distribution will occur within the diaphragm aperture. In contrast thereto, a mode spot migrates in a circumferential direction of the circular exit face given twisting of the light waveguide and, thus, within the diaphragm aperture so that the chronological change in the intensity distribution is diminished. The guide element of the light transmission device is fashioned a pivotable lever mechanism. This lever mechanism supports the fiber optical light waveguide so that it is only twisted and not bent. This solution, however, is extremely involved.

SUMMARY OF THE INVENTION

The object of the present invention is to create a simple light transmission device wherein particular discontinuous changes of the motion and, thus, of the lighting distribution and light intensity as well are eliminated in a motion sequence of the light waveguide. The particularly disturbing, discontinuous density changes on the recording medium are thereby avoided in an advantageous way by applying such a light transmission device in an electronic reproduction device.

To accomplish these goals, the present invention is directed to an improvement in a device for light transmission between a stationary position and a movable location comprising at least one fiber optical waveguide and one guide element for the fiber optical waveguide extending between the stationary position and movable location. The improvement is that the guide element is flexible. Thus, the guide element provides means for maintaining the same bends and stresses on the fiber optical waveguide as the movable location moves relative to the stationary position.

BRIEF DESCRIPTION OF THE DRAWINGS

FIG. 1 is a perspective view of the light transmission device of the present invention; and FIG. 2 is an enlarged cross-sectional view taken along lines A—A of FIG. 1.

DESCRIPTION OF THE PREFERRED EMBODIMENTS

An exemplary embodiment of the light transmission device of the present invention is illustrated as being employed in an electronic reproduction device for producing half-tone color separations. It should be noted that only the recording drum and recording element of this reproduction device are illustrated in FIG. 1.

The light transmission device is composed of a movable guide element 1 and of at least one fiber optical light waveguide 2 which serves to transmit a light beam 3, which is modulated by a stationary modulator (not shown) dependent on an image signal, to a recording element, which is moving axially along a recording drum 5 of a reproduction device in the direction of an arrow 4 during an exposure of the color separation. Only a base plate 6 of the recording element is shown. This base plate slides on two tubular or cylindrical guides 7 and 8 which extend in the axial direction of the recording drum 5. As illustrated, the modulated light beam 3 is coupled into an entrance face 9 of the fiber optical waveguide 2 and is then transmitted to the recording element where it in turn emerges at an exit face 10 of the waveguide 2. The modulated light beam 3, which emerges from the face 10, is imaged as an exposure point 13 on a recording medium 14 which is clamped to the recording drum 5. The imaging is accomplished by an imaging arrangement, which includes a diaphragm 11 and a lens 12. The diaphragm 11 and lens 12 are secured in a suitable fashion to the base plate 6 of the recording element. The recording medium 14, for example, a film, is exposed point-by-point and line-by-line due to the axial motion of the recording element in the direction of the arrow 4 and due to the rotational movement of the recording drum 5 in the direction of arrow 15. The exposed and developed film will have the desired color separation.

The flexible guide element 1 of the light transmission device has its one end 16 secured to a rail 17 which is fashioned as an unwinding member with a surface 30 for the element 1. The rail 17 is aligned to extend parallel to the guides 7 and 8 and is connected to the stationary part of the reproduction device. The element 1 from the end 16 is conducted in an arc or curved path, which has a U shape, and terminates at another end 18 which is connected to the base plate 6 of the recording element. During a feed movement of the recording element in the direction of the arrow 4, the flexible guide 1 rolls off of the surface 30 of the rail 17 with a constant radius R for the correct portion or path. The positions respectively of the guide element 1 is reached after certain feed times for the recording element and are indicated in broken lines.

The fiber optical waveguide 2 is composed of an actual light waveguide and of a protective sheath for the light waveguide. The light waveguide itself is an individual fiber having a core and a jacket. However, it can also be a bundle of individual fibers. The individual fiber is of a multimode-type and, for example, is either a fiber having a stepped index of refraction or a gradient index of refraction across its diameter. The flexible guide element 1 is flexible in a moving direction and is designed to be as flexibly stiff as possible perpendicular thereto. In the illustrated embodiment, the flexible guide element 7 is a metal band preferably a spring steel band. However, it can also be composed of a spring wire, of a synthetic band, or the like. In accordance with the invention, the fiber optical light waveguide 2 is situated and secured along at least one of the longitudinal sides of the guide element 1 so that the fiber optical waveguide always lies in the region of the flexural plane or, respectively, of the neutral axis of the guide element 1, preferably directly in the flexural plane or, respectively, neutral axis. The flexural plane or, respectively, neutral axis is that plane or axis of the guide element 1 in which the bending stresses occurring during the unwinding event of the flexural guide elements are nearly zero or are zero. As a result of the inventive design of the light transmission device, discontinuous relative motion between guide element 1 and the fiber optical waveguide 2 on the one hand and between the light waveguide and sheath on the other hand are avoided in an advantageous way so that a uniform motion sequence is achieved for the optical light waveguide. The result of this uniform motion sequence, in turn, is that no discontinuous changes in the light distribution and- /or light intensity occurs in the light waveguides of the multimode type.

For fastening the fiber optical light waveguides 2 to the element 1, there is provided a plurality of tongues at least along one longitudinal side as illustrated in the exemplary embodiment. The tongues, for example, are stamped out of the guide element and are shaped such as to form fastening straps 19 so that two adjacent straps will grasp the optical waveguide one from the above and one from below. In FIG. 1, only a portion of the fiber optical waveguide 2 and only some of the fastening straps are illustrated. It should be noted that other ways of attaching the optical waveguide to the edge of the guide element can be utilized in the framework of the present invention.

The invention is not limited to the exemplary embodiment or used for the light transmission device in an electronic reproduction device for producing half-tone color separations. The light transmission device of the invention can also be advantageously utilized in an electronic reproduction device for producing raster color separation, for scanning and recording as well as generally everywhere that light is to be transmitted from a stationary location to a movable location or vice versa.

For purposes of illustration, FIG. 2 shows a crosssectional view of the mounting of the light waveguide 2 to the guide element 1 in the region where the element 1 lies on the surface 30 of the rail 17. The guide element 1 with the fastening straps 19 and the optical fiber waveguide 2 are visible. Further, the flexural plane or preferably the neutral axis 20 of the guide element 1 is also indicated. It is noted that the optical waveguide 2 is secured in a side region of the guide element 1 with the axis of the waveguide 2 being on the axis of the neutral axis or plane 20.

As can be seen hereinabove, regardless of movement of the base plate 6 of the recording element along the guides 7 and 8, the element 1 and the corresponding fiber optical waveguide 2 will have a U-shaped bend of a constant radius R although the portion of the waveguide 2 being bent through this curvature may change along the length of the waveguide. Thus, the bending stresses on the waveguide will be constant regardless of the position of the base plate 6. The guide element 1 thus acts as means to mount the optical waveguide 2 to have a continuous amount of bending stresses which stresses are always the same and therefore will not cause any migration of the mode spots to cause any speckling or chronological change of the intensity distribution in the output of the optical waveguide 2.

Although various minor modifications may be suggested by those versed in the art, it should be understood that we wish to embody within the scope of the patent granted hereon, all such modifications as reasonably and properly come within the scope of our contribution to the art.

We claim:

1. In a device for a light transmission between a stationary position and a movable location, said device comprising a fiber optical waveguide and one guide element for said fiber optical waveguide, said guide element having one ned connected to the stationary position and the other end being connected to the movable location, the improvements comprising means for maintaing the same bends and stresses on the fiber optical waveguide as the movable location moves relative to the stationary position, said means comprising the guide element being flexible and having a U-shaped configuration with a pair of legs extending from a curved portion of a fixed radius, one leg of the pair connected to the stationary position and the other leg of the pair connected to the movable location, said fiber optical waveguide being connected to the guide element with substantially the same curvature so that as the movable location shifts relative to the stationary position the radius of curvature is maintained as the lengths of the legs of the U-shaped configuration change.

2. In a device according to claim 1, wherein the flexible element has a flexure plane with a neutral axis and said optical light waveguide is situated in the flexure plane so that the bending stresses remain substantially constant.

3. In a device according to claim 2, wherein the flexible guide element is a strip-shaped band and said fiber optical waveguide is connected to an edge of said band by mounting means.

4. In a device according to claim 3, wherein said mounting means comprise integral fastening straps provided along the edge of the band.

5. In a device according to claim 1, wherein the end of the flexible guide element connected to the stationary position is connected to a stationary rail having a surface supporting one of the legs of the U-shaped bend of the guide element and said one leg of the U-shaped guide element being received on the surface as the movable station moves in one direction and unwinding from contact with said surface as the movable location shifts in the opposite direction.

6. In a device for light transmission between a stationary position and a movable location, said device comprising at least one fiber optical light waveguide and one guide element connected to said fiber optical waveguide, said waveguide and guide element extending between the stationary position and the movable location, the improvements comprising said stationary position including a rail having a surface, said guide element being a flexible guide element and being a strip-shaped band of material with a flexural plane with a neutral axis extending along the length of the element, said fiber optical light waveguide being mounted on the guide element to lie in a region of the flexural plane of the element, said band having a flat surface with one end of the flat surface being connected to the surface of the rail of the stationary position and the other end of the flat surface being connected to the movable location, said flexible guide element rolling off of said surface of the rail as the movable location moves relative to the stationary position.

7. In a device according to claim 6, wherein the flexible guide element is a metal band.

8. In a device according to claim 7, wherein said metal band of the flexible guide element is a spring steel band and the guide element is mounted along a lateral edge of the spring steel band.

9. In a device according to claim 6, wherein the band along at least one longitudinal side has fastening straps for mounting the fiber optical waveguide thereto.

10. In a device for light transmission between a stationary location and a movable location which is movable relatively to the stationary location in a moving plane along a moving direction, said device comprising at least one fiber optical light waveguide extending between the stationary location and the movable location and one guide element for said fiber optical light waveguide, the improvement comprising a first mounting plane in the movable location and a second mounting plane in the stationary location, said first and second mounting planes extending perpendicular to a reference plane containing the moving direction, said guide element being an elongated guide element having end portions and being flexible in a preferred plane having a low moment of resistance, said guide element extending between said first and second mounting planes and being connected within end portions to said first and second mounting planes with a transversal extension of the preferred plane of the guide element always extending perpendicular to the reference plane, and said guide element having a plane of flexure belonging to said preferred plane and said fiber optical light waveguide being mounted to always be in the region of said plane of flexure along the longitudinal extension of said guide element.

11. In a device according to claim 10, wherein the guide elemetn is a strip-shaped bendable metal band.

12. In a device according to claim 11, wherein the metal band is a spring steel band.

13. In a device according to claim 10, wherein the guide element is provided with fastening straps along at least one longitudinal side with said fastening straps mounting said fiber optical light waveguide in the guide element.

14. In a device according to claim 10, wherein the second mounting plane is formed as a supporting plane for said guide element aligned in the moving direction, said guide element rolling on said supporting plane as the first mounting plane moves relative to the second mounting plane.

* * * * *